US012809136B2

(12) United States Patent
Chang

(10) Patent No.: US 12,809,136 B2
(45) Date of Patent: Nov. 24, 2026

(54) WIDE-ANGLE LENS ASSEMBLY

(71) Applicants: Sintai Optical (Shenzhen) Co., Ltd., ShenZhen City (CN); Asia Optical Co., Inc., Taichung (TW)

(72) Inventor: An-Kai Chang, Taichung (TW)

(73) Assignees: SINTAI OPTICAL (SHENZHEN) CO., LTD., Shenzhen City (CN); ASIA OPTICAL CO., INC., Taichung (TW)

( * ) Notice: Subject to any disclaimer, the term of this patent is extended or adjusted under 35 U.S.C. 154(b) by 296 days.

(21) Appl. No.: 18/596,767

(22) Filed: Mar. 6, 2024

(65) Prior Publication Data

US 2024/0310610 A1 Sep. 19, 2024

(30) Foreign Application Priority Data

Mar. 17, 2023 (CN) ......................... 202310259335.4

(51) Int. Cl.

*G02B 13/06* (2006.01)
*G02B 9/34* (2006.01)
*G02B 13/00* (2006.01)

(52) U.S. Cl.

CPC ............... *G02B 13/06* (2013.01); *G02B 9/34* (2013.01); *G02B 13/004* (2013.01)

(58) Field of Classification Search

CPC ......... G02B 13/004; G02B 13/06; G02B 9/34
See application file for complete search history.

(56) References Cited

U.S. PATENT DOCUMENTS

| | | | | |
|---|---|---|---|---|
| 11,415,777 | B2 | 8/2022 | Chang et al. | |
| 2018/0210170 | A1 | 7/2018 | Lee et al. | |
| 2022/0260809 | A1 | 8/2022 | Zou et al. | |
| 2022/0382015 | A1* | 12/2022 | Nishimura | B60R 1/24 |

FOREIGN PATENT DOCUMENTS

| | | | |
|---|---|---|---|
| CN | 108363168 | A | 8/2018 |
| CN | 112698473 | A | 4/2021 |
| TW | M356916 | U | 5/2009 |

* cited by examiner

*Primary Examiner* — Angela M. Medich
(74) *Attorney, Agent, or Firm* — McClure, Qualey & Rodack, LLP

(57) ABSTRACT

A wide-angle lens assembly includes a first lens, a second lens, a third lens, and a fourth lens. The first lens is a meniscus lens with negative refractive power and includes a convex surface facing an object side and a concave surface facing an image side. The second lens is with refractive power and includes a concave surface facing the image side. The third lens is a biconvex lens with positive refractive power and includes a convex surface facing the object side and another convex surface facing the image side. The fourth lens is with refractive power. The first lens, the second lens, the third lens, and the fourth lens are arranged in order from the object side to the image side along an optical axis.

20 Claims, 12 Drawing Sheets

WIDE-ANGLE LENS ASSEMBLY

BACKGROUND OF THE INVENTION

Field of the Invention

The present invention relates to a wide-angle lens assembly.

DESCRIPTION OF THE RELATED ART

The current development trend of a wide-angle lens assembly is toward large field of view. Additionally, the wide-angle lens assembly is developed to have small F-number, high resolution, and resistant to environment temperature change in accordance with different application requirements. However, the known wide-angle lens assembly can't satisfy such requirements. Therefore, the wide-angle lens assembly needs a new structure in order to meet the requirements of large field of view, small F-number, high resolution, and resistant to environment temperature change at the same time.

BRIEF SUMMARY OF THE INVENTION

The invention provides a wide-angle lens assembly to solve the above problems. The wide-angle lens assembly of the invention is provided with characteristics of an increased field of view, a decreased F-number, an increased resolution, a resisted environment temperature change, and still has a good optical performance.

The wide-angle lens assembly in accordance with an exemplary embodiment of the invention includes a first lens, a second lens, a third lens, and a fourth lens. The first lens is a meniscus lens with negative refractive power and includes a convex surface facing an object side and a concave surface facing an image side. The second lens is with refractive power and includes a concave surface facing the image side. The third lens is a biconvex lens with positive refractive power and includes a convex surface facing the object side and another convex surface facing the image side. The fourth lens is with refractive power. The first lens, the second lens, the third lens, and the fourth lens are arranged in order from the object side to the image side along an optical axis. The wide-angle lens assembly satisfies at least one of the following conditions: $0.3 \le (CT2+CT3)/Td2 \le 1.1$; $0.25 \le (Td2+Td3)/TTL \le 0.38$; wherein CT2 is an interval from an object side surface of the second lens to an image side surface of the second lens along the optical axis, CT3 is an interval from an object side surface of the third lens to an image side surface of the third lens along the optical axis, Td2 is an interval from the image side surface of the second lens to the object side surface of the third lens along the optical axis, Td3 is an interval from the image side surface of the third lens to an object side surface of the fourth lens along the optical axis, and TTL is an interval from an object side surface of the first lens to an image plane along the optical axis.

In another exemplary embodiment, the fourth lens is with positive refractive power.

In yet another exemplary embodiment, the fourth lens includes a convex surface facing the object side.

In another exemplary embodiment, the fourth lens further includes a concave surface facing the image side.

In yet another exemplary embodiment, the wide-angle lens assembly satisfies at least one of the following conditions: $0.08 \le CT3/TTL \le 0.15$; $-0.7 \le f1/TTL \le -0.4$; $1.0 \le f1/f2 \le 1.4$; $0.7 \le f3/f4 \le 0.9$; $1.3 \le (Td2+Td3)/BFL \le 2.2$; wherein f1 is an effective focal length of the first lens, f2 is an effective focal length of the second lens, f3 is an effective focal length of the third lens, f4 is an effective focal length of the fourth lens, CT3 is the interval from the object side surface of the third lens to the image side surface of the third lens along the optical axis, Td2 is the interval from the image side surface of the second lens to the object side surface of the third lens along the optical axis, Td3 is the interval from the image side surface of the third lens to the object side surface of the fourth lens along the optical axis, TTL is the interval from the object side surface of the first lens to the image plane along the optical axis, and BFL is an interval from an image side surface of the fourth lens to the image plane along the optical axis.

In another exemplary embodiment, the fourth lens further includes a convex surface facing the image side.

In yet another exemplary embodiment, the second lens is with negative refractive power.

In another exemplary embodiment, the second lens further includes a concave surface facing the object side.

In yet another exemplary embodiment, the second lens further includes a convex surface facing the object side.

In another exemplary embodiment, the wide-angle lens assembly further includes a stop disposed between the second lens and the third lens, or further includes a stop disposed between the second lens and the third lens and a reflective element disposed next to the stop, or further includes a stop disposed between the second lens and the third lens and a reflective element disposed between the fourth lens and the image plane.

In yet another exemplary embodiment, the second lens is an aspheric lens or the fourth lens is an aspheric lens.

In another exemplary embodiment, the second lens is with negative refractive power and further includes another concave surface facing the object side, the fourth lens is with positive refractive power and includes a convex surface facing the object side and a concave surface facing the image side, and the wide-angle lens assembly further includes a stop disposed between the second lens and the third lens, or further includes a stop disposed between the second lens and the third lens and a reflective element disposed next to the stop, or further includes a stop disposed between the second lens and the third lens and a reflective element disposed between the fourth lens and the image plane.

In yet another exemplary embodiment, the second lens is with negative refractive power and further includes another concave surface facing the object side, the fourth lens is with positive refractive power and includes a convex surface facing the object side and another convex surface facing the image side, and the wide-angle lens assembly further includes a stop disposed between the second lens and the third lens, or further includes a stop disposed between the second lens and the third lens and a reflective element disposed next to the stop, or further includes a stop disposed between the second lens and the third lens and a reflective element disposed between the fourth lens and the image plane.

In another exemplary embodiment, the second lens is with negative refractive power and further includes a convex surface facing the object side, the fourth lens is with positive refractive power and includes a convex surface facing the object side and a concave surface facing the image side, and the wide-angle lens assembly further includes a stop disposed between the second lens and the third lens, or further includes a stop disposed between the second lens and the third lens and a reflective element disposed next to the stop, or further includes a stop disposed between the second lens and the third lens and a reflective element disposed between the fourth lens and the image plane.

In yet another exemplary embodiment, the second lens is with negative refractive power and further includes a convex surface facing the object side, the fourth lens is with positive refractive power and includes a convex surface facing the object side and another convex surface facing the image side, and the wide-angle lens assembly further includes a stop disposed between the second lens and the third lens, or further includes a stop disposed between the second lens and the third lens and a reflective element disposed next to the stop, or further includes a stop disposed between the second lens and the third lens and a reflective element disposed between the fourth lens and the image plane.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a wide-angle lens assembly including a first lens, a second lens, a third lens, and a fourth lens. The first lens is a meniscus lens with negative refractive power and includes a convex surface facing an object side and a concave surface facing an image side. The second lens is with refractive power and includes a concave surface facing the image side. The third lens is a biconvex lens with positive refractive power and includes a convex surface facing the object side and another convex surface facing the image side. The fourth lens is with refractive power. The first lens, the second lens, the third lens, and the fourth lens are arranged in order from the object side to the image side along an optical axis. The wide-angle lens assembly satisfies at least one of the following conditions: $0.3 \leq (CT2+CT3)/Td2 \leq 1.1$; $0.25 \leq (Td2+Td3)/TTL \leq 0.38$;

wherein CT2 is an interval from an object side surface of the second lens to an image side surface of the second lens along the optical axis, CT3 is an interval from an object side surface of the third lens to an image side surface of the third lens along the optical axis, Td2 is an interval from the image side surface of the second lens to the object side surface of the third lens along the optical axis, Td3 is an interval from the image side surface of the third lens to an object side surface of the fourth lens along the optical axis, and TTL is an interval from an object side surface of the first lens to an image plane along the optical axis. A wide-angle lens assembly of the present invention is a preferred embodiment of the present invention when the wide-angle lens assembly satisfies the above features and at least one of the above conditions.

Referring to Table 1, Table 2, Table 4, Table 5, Table 7, and Table 8, wherein Table 1, Table 4, and Table 7 show optical specification in accordance with a first, second, and third embodiments of the invention, respectively and Table 2, Table 5, and Table 8 show aspheric coefficients of each aspheric lens in Table 1, Table 4, and Table 7, respectively. The aspheric surface sag z of each aspheric lens in the following embodiments can be calculated by the following formula: $z=ch^2/\{1+[1-(k+1)c^2h^2]^{1/2}\}+Ah^4+Bh^6+Ch^8$, where c is curvature, h is the vertical distance from the lens surface to the optical axis, k is conic constant, A, B, and C are aspheric coefficients, and the value of the aspheric coefficient A, B, and C are presented in scientific notation, such as 2E-03 for $2\times10^{-3}$.

Figure 1:
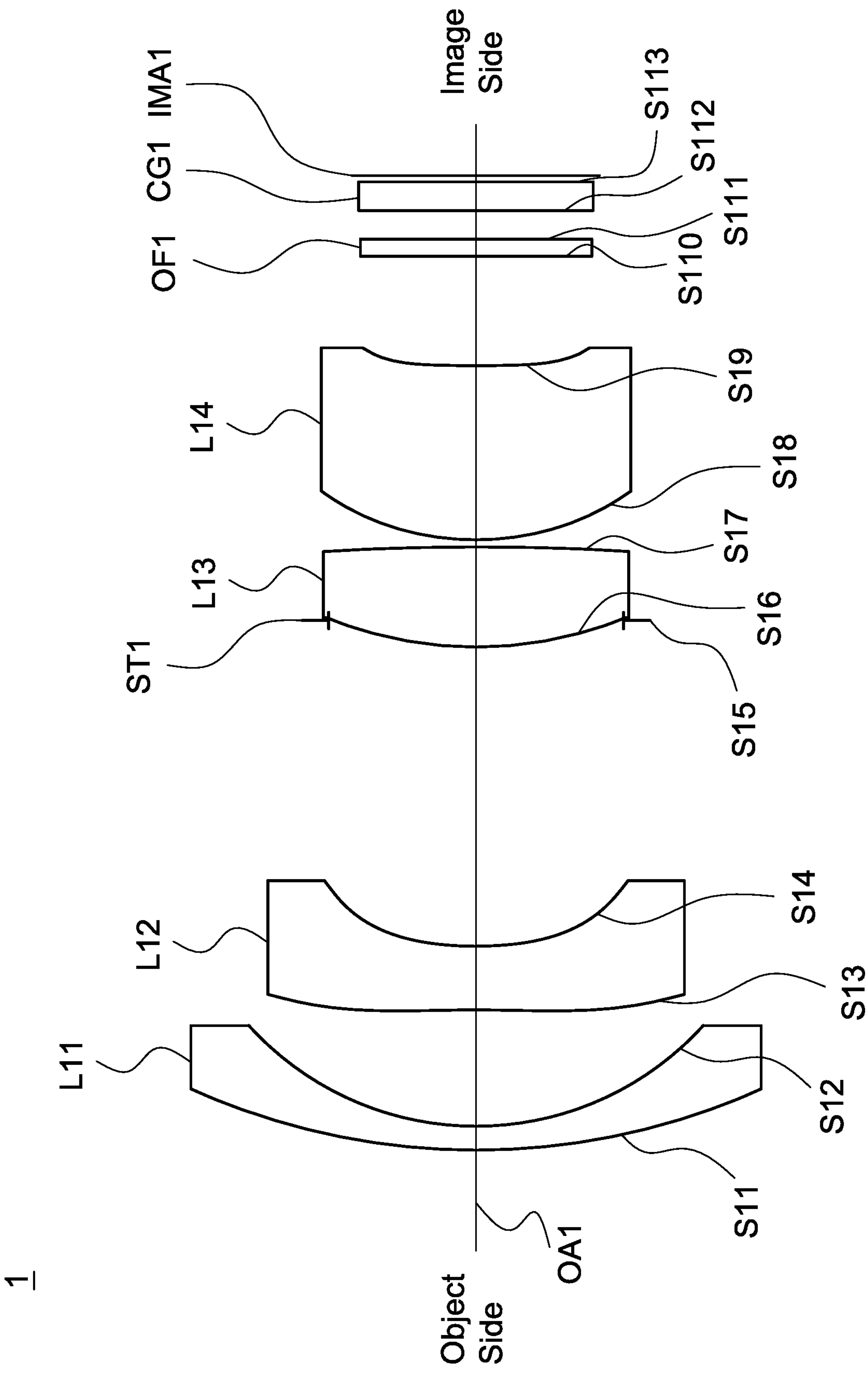
FIG. 1 is a lens layout diagram of a wide-angle lens assembly in accordance with a first embodiment of the invention.
Figure 5:
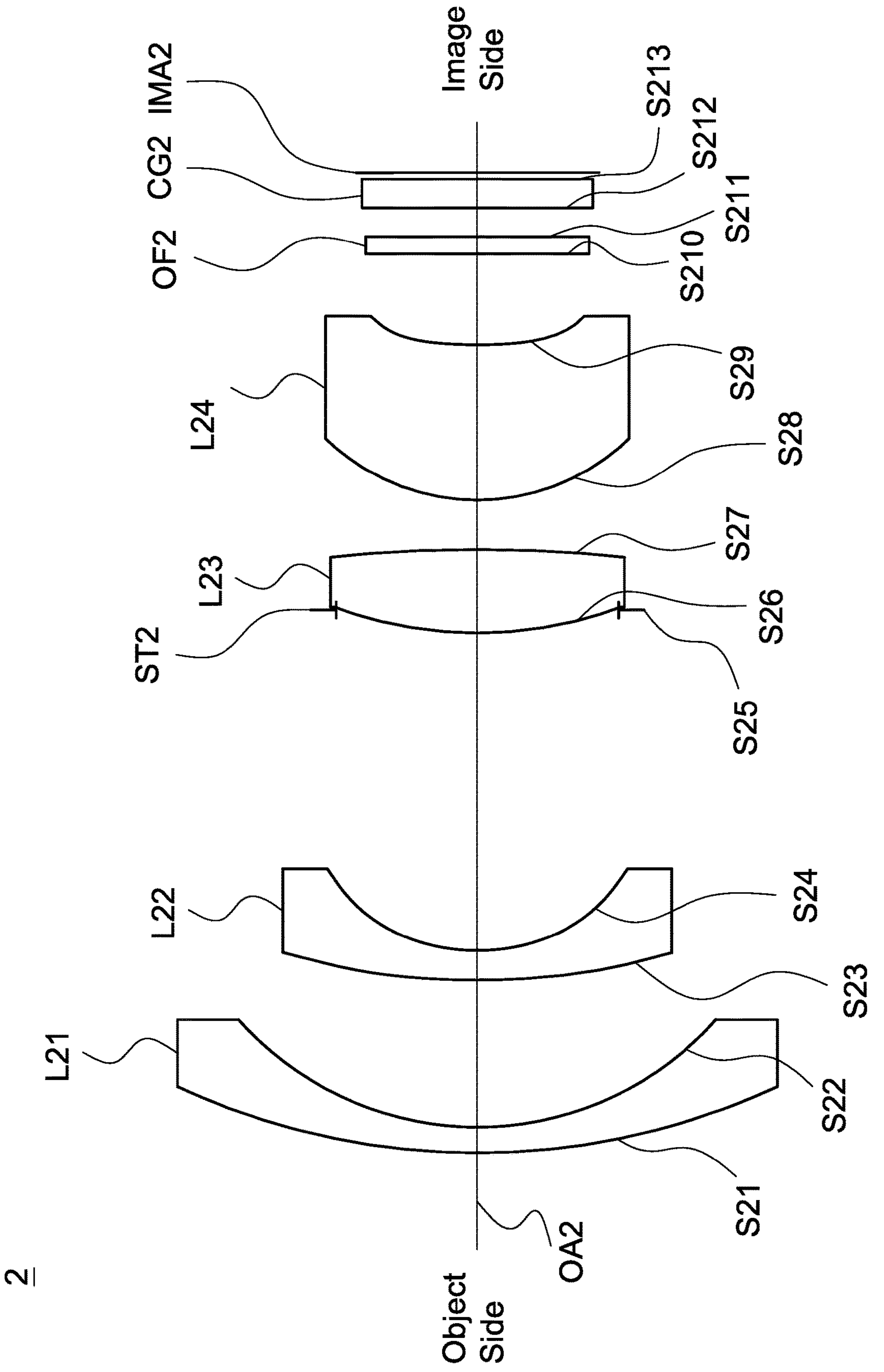
FIG. 5 is a lens layout diagram of a wide-angle lens assembly in accordance with a second embodiment of the invention.
Figure 9:
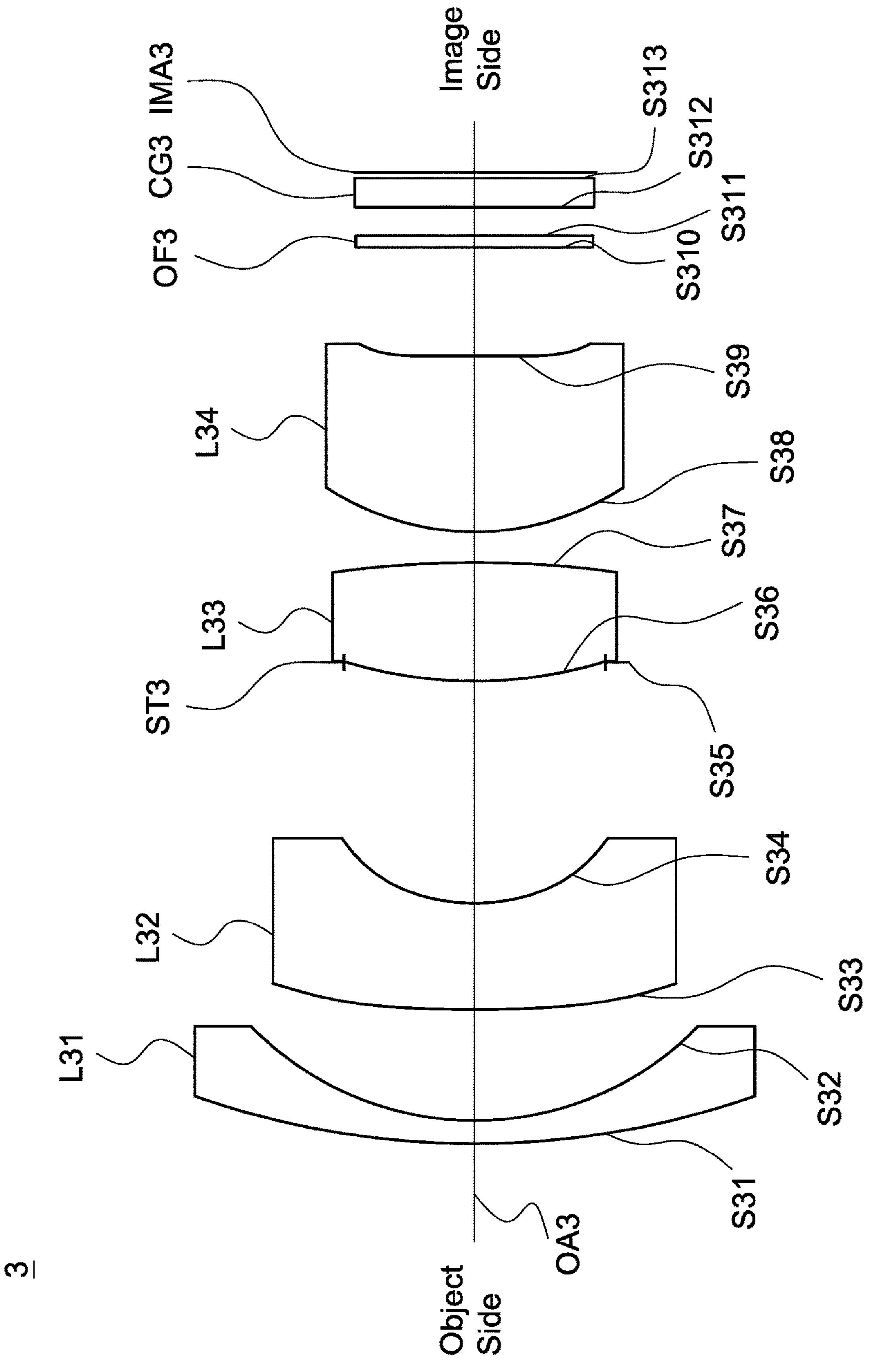
FIG. 9 is a lens layout diagram of a wide-angle lens assembly in accordance with a third embodiment of the invention.

FIGS. 1, 5, 9 are lens layout diagrams of the lens assemblies in accordance with the first, second, and third embodiments of the invention, respectively.

The first lenses L11, L21, L31 are meniscus lenses with negative refractive power and made of glass material, wherein the object side surfaces S11, S21, S31 are convex surfaces, the image side surfaces S12, S22, S32 are concave surfaces, and both of the object side surfaces S11, S21, S31 and image side surfaces S12, S22, S32 are spherical surfaces.

The second lenses L12, L22, L32 are with negative refractive power and made of plastic material, wherein the image side surfaces S14, S24, S34 are concave surfaces and both of the object side surfaces S13, S23, S33 and image side surfaces S14, S24, S34 are aspheric surfaces.

The third lenses L13, L23, L33 are biconvex lenses with positive refractive power and made of glass material, wherein the object side surfaces S16, S26, S36 are convex surfaces, the image side surfaces S17, S27, S37 are convex surfaces, and both of the object side surfaces S16, S26, S36 and image side surfaces S17, S27, S37 are spherical surfaces.

The fourth lenses L14, L24, L34 are with positive refractive power and made of plastic material, wherein the object side surfaces S18, S28, S38 are convex surfaces and both of the object side surfaces S18, S28, S38 and image side surfaces S19, S29, S39 are aspheric surfaces.

In addition, the lens assemblies 1, 2, and 3 satisfy at least one of the following conditions (1)-(7):

$$1.0 < f1/f2 < 1.4; \quad (1)$$

$$0.3 \leq (CT2+CT3)/Td2 \leq 1.1; \quad (2)$$

$$0.25 \leq (Td2+Td3)/TTL \leq 0.38; \quad (3)$$

$$1.3 \leq (Td2+Td3)/BFL \leq 2.2; \quad (4)$$

-continued $$0.7 \le f3/f4 \le 0.9; \quad (5)$$

$$0.08 \le CT3/TTL \le 0.15; \quad (6)$$

$$-0.7 \le f1/TTL \le -0.4; \quad (7)$$

wherein: f1 is an effective focal length of the first lenses L11, L21, L31 for the first to third embodiments; f2 is an effective focal length of the second lenses L12, L22, L32 for the first to third embodiments; f3 is an effective focal length of the third lenses L13, L23, L33 for the first to third embodiments; f4 is an effective focal length of the fourth lenses L14, L24, L34 for the first to third embodiments; CT2 is an interval from the object side surfaces S13, S23, S33 of the second lenses L12, L22, L32 to the image side surfaces S14, S24, S34 of the second lenses L12, L22, L32 along the optical axes OA1, OA2, OA3 for the first to third embodiments; CT3 is an interval from the object side surfaces S16, S26, S36 of the third lenses L13, L23, L33 to the image side surfaces S17, S27, S37 of the third lenses L13, L23, L33 along the optical axes OA1, OA2, OA3 for the first to third embodiments; Td2 is an interval from the image side surfaces S14, S24, S34 of the second lenses L12, L22, L32 to the object side surfaces S16, S26, S36 of the third lenses L13, L23, L33 along the optical axes OA1, OA2, OA3 for the first to third embodiments; Td3 is an interval from the image side surfaces S17, S27, S37 of the third lenses L13, L23, L33 to the object side surfaces S18, S28, S38 of the fourth lenses L14, L24, L34 along the optical axes OA1, OA2, OA3 for the first to third embodiments; TTL is an interval from the object side surfaces S11, S21, S31 of the first lenses L11, L21, L31 to the image planes IMA1, IMA2, IMA3 along the optical axes OA1, OA2, OA3 for the first to third embodiments; and BFL is an interval from the image side surfaces S19, S29, S39 of the fourth lenses L14, L24, L34 to the image planes IMA1, IMA2, IMA3 along the optical axes OA1, OA2, OA3 for the first to third embodiments. With the wide-angle lens assemblies 1, 2, 3 satisfying at least one of the above conditions (1)-(7), the F-number can be effectively decreased, the field of view can be effectively increased, the resolution can be effectively increased, the environment temperature change can be effectively resisted, and the aberration can be effectively corrected.

When the condition (1): 1.0<f1/f2<1.4 is satisfied, the sensitivity during lens assembly process can be effectively decreased to improve the assembly yield for the wide-angle lens assembly. When the conditions (2), (3), or (4): 0.3≤(CT1+CT2)/Td2≤1.1; 0.25≤(Td2+Td3)/TTL≤0.38; 1.3≤(Td2+Td3)/BFL≤2.2; is satisfied, the sensitivity during lens assembly process can be effectively decreased to improve the assembly yield for the wide-angle lens assembly.

A detailed description of a wide-angle lens assembly in accordance with a first embodiment of the invention is as follows. Referring to FIG. 1, the wide-angle lens assembly 1 includes a first lens L11, a second lens L12 a stop ST1, a third lens L13, a fourth lens L14, an optical filter OF1, and a cover glass CG1, all of which are arranged in order from an object side to an image side along an optical axis OA1. In operation, the light from the object side is imaged on an image plane IMA1.

According to the foregoing, wherein: the second lens L12 is a biconcave lens, wherein the object side surface S13 is a concave surface; the fourth lens L14 is a meniscus lens, wherein the image side surface S19 is a concave surface; both of object side surface S110 and image side surface S111 of the optical filter OF1 are plane surfaces; and both of the object side surface S112 and image side surface S113 of the cover glass CG1 are plane surfaces.

With the above design of the lenses, stop ST1, and at least one of the conditions (1)-(7) satisfied, the wide-angle lens assembly 1 can have an effective decreased F-number, an effective increased field of view, an effective increased resolution, an effective resisted environment temperature change, and an effective corrected aberration.

Table 1 shows the optical specification of the wide-angle lens assembly 1 in FIG. 1.

TABLE 1

Effective Focal Length = 1.99 mm F-number = 1.25
Total Lens Length = 17.00 mm Field of View = 110.07 degrees

| Surface Number | Radius of Curvature (mm) | Thickness (mm) | Nd | Vd | Effective Focal Length (mm) | Remark |
|---|---|---|---|---|---|---|
| S11 | 10.58 | 0.42 | 2 | 29.1 | −9.21 | L11 |
| S12 | 4.75 | 2.02 | | | | |
| S13 | −25.85 | 1.11 | 1.54 | 56 | −8.2902 | L12 |
| S14 | 5.44 | 5.69 | | | | |
| S15 | ∞ | −0.46 | | | | ST1 |
| S16 | 5.94 | 1.75 | 1.83 | 37.3 | 6.37117 | L13 |
| S17 | −35.40 | 0.12 | | | | |
| S18 | 4.25 | 3.04 | 1.64 | 23.5 | 7.58014 | L14 |
| S19 | 34.03 | 1.91 | | | | |
| S110 | ∞ | 0.30 | 1.52 | 64.2 | | OF1 |
| S111 | ∞ | 0.50 | | | | |
| S112 | ∞ | 0.50 | 1.52 | 64.2 | | CG1 |
| S113 | ∞ | 0.11 | | | | |

In the first embodiment, the conic constant k and the aspheric coefficients A, B, C of each aspheric lens are shown in Table 2.

TABLE 2

| Surface Number | k | A | B | C |
|---|---|---|---|---|
| S13 | 0.0000E+00 | 6.0444E−03 | −1.9598E−04 | 0.0000E+00 |
| S14 | 0.0000E+00 | 9.8171E−03 | 9.2161E−04 | 0.0000E+00 |
| S18 | 0.0000E+00 | 7.5262E−04 | 3.0031E−05 | 0.0000E+00 |
| S19 | 0.0000E+00 | 1.7432E−02 | −1.9119E−04 | 5.6322E−04 |

Table 3 shows the parameters and condition values for conditions (1)-(7) in accordance with the first embodiment of the invention. It can be seen from Table 3 that the wide-angle lens assembly 1 of the first embodiment satisfies the conditions (1)-(7).

TABLE 3

| | | | | | |
|---|---|---|---|---|---|
| CT2 | 1.11 mm | CT3 | 1.75 mm | Td2 | 5.22 mm |
| Td3 | 0.12 mm | BFL | 3.32 mm | | |
| f1/f2 | 1.11 | (CT2 + CT3)/Td2 | 0.55 | (Td2 + Td3)/TTL | 0.31 |
| (Td2 + Td3)/BFL | 1.61 | f3/f4 | 0.84 | CT3/TTL | 0.10 |
| f1/TTL | −0.54 | | | | |

Figure 2:
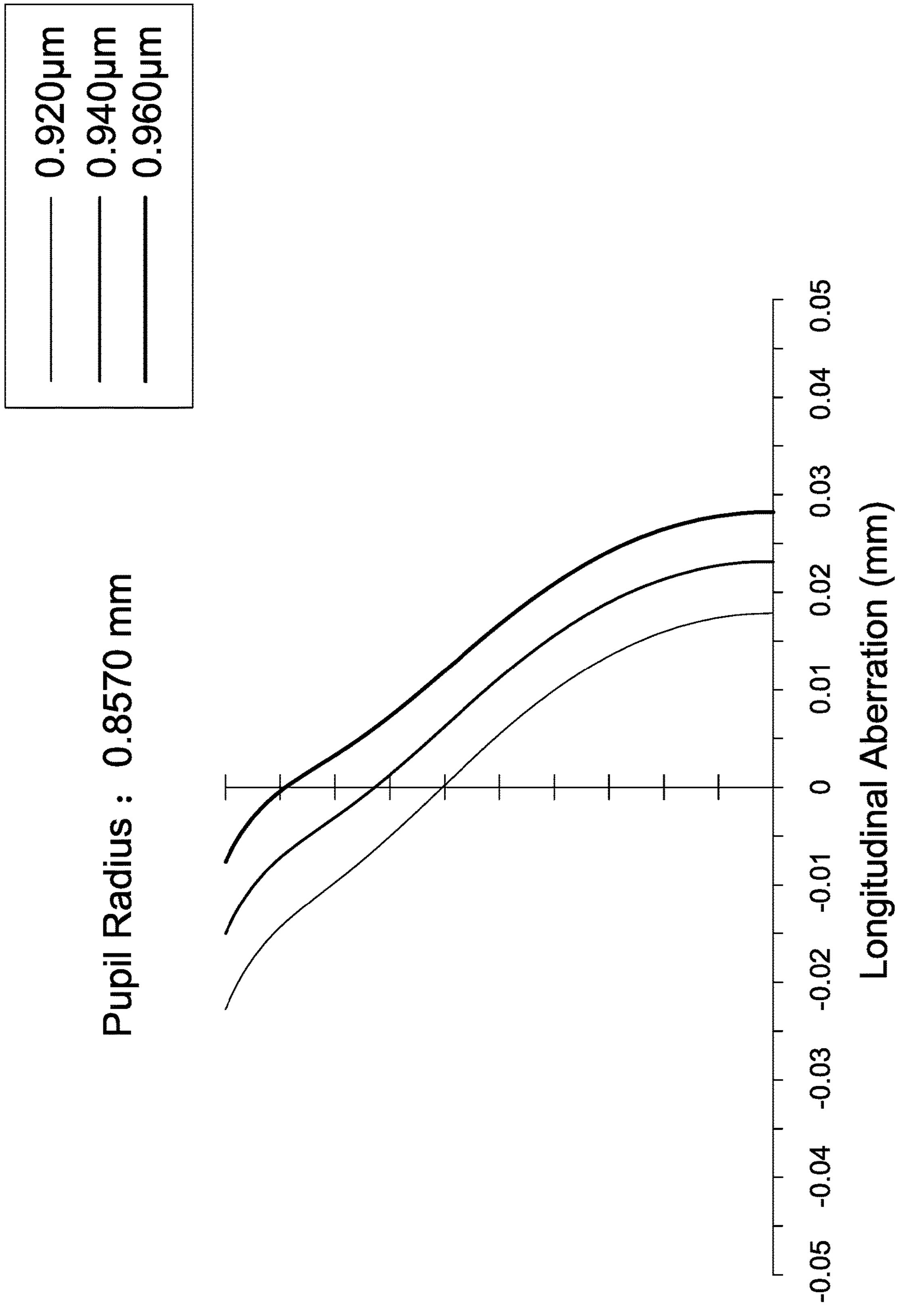
FIGS. 2, 3, 4 depict a longitudinal aberration diagram, a field curvature diagram, and a distortion diagram of the wide-angle lens assembly in accordance with the first embodiment of the invention, respectively.
Figure 3:
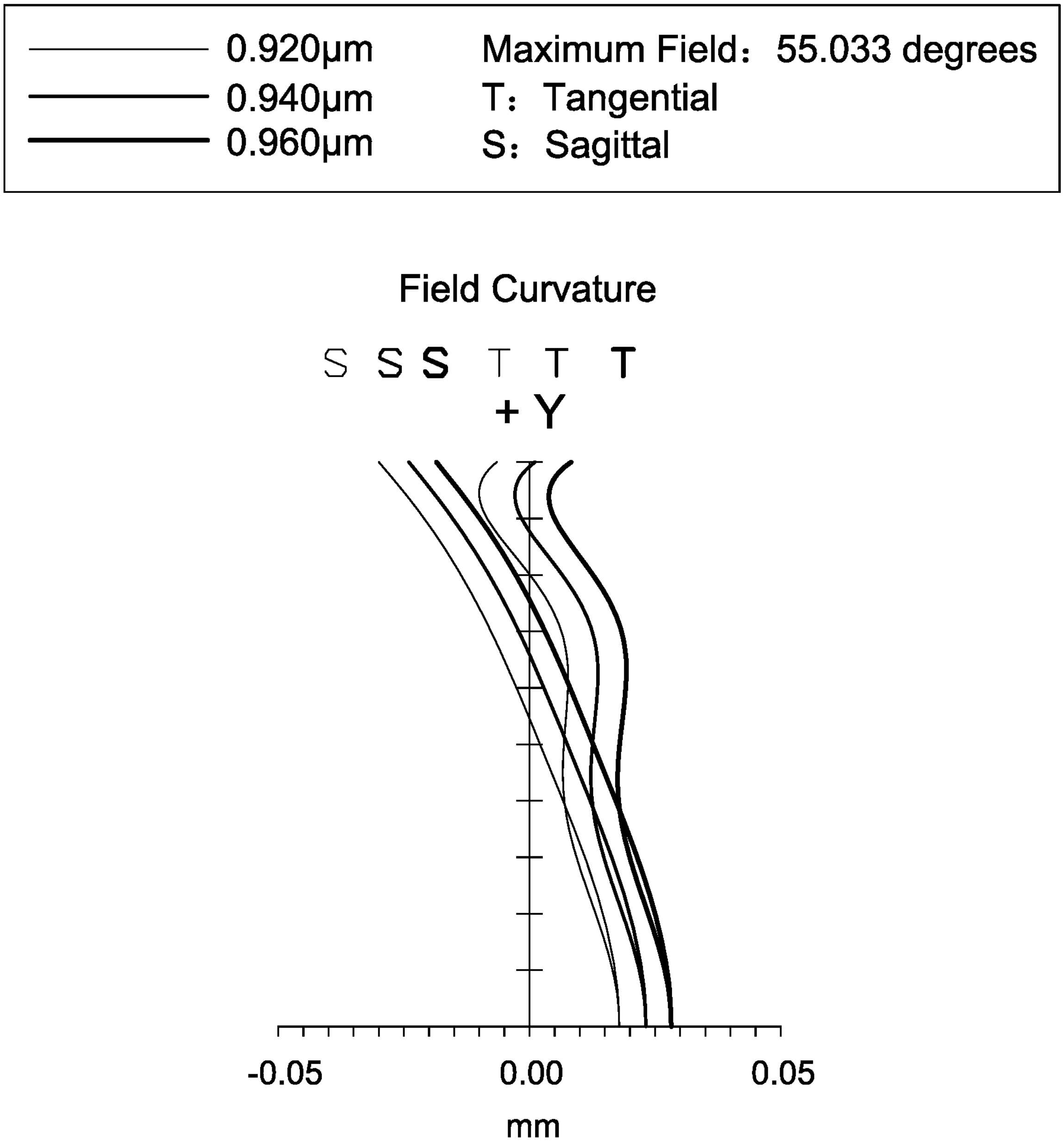
Figure 4:
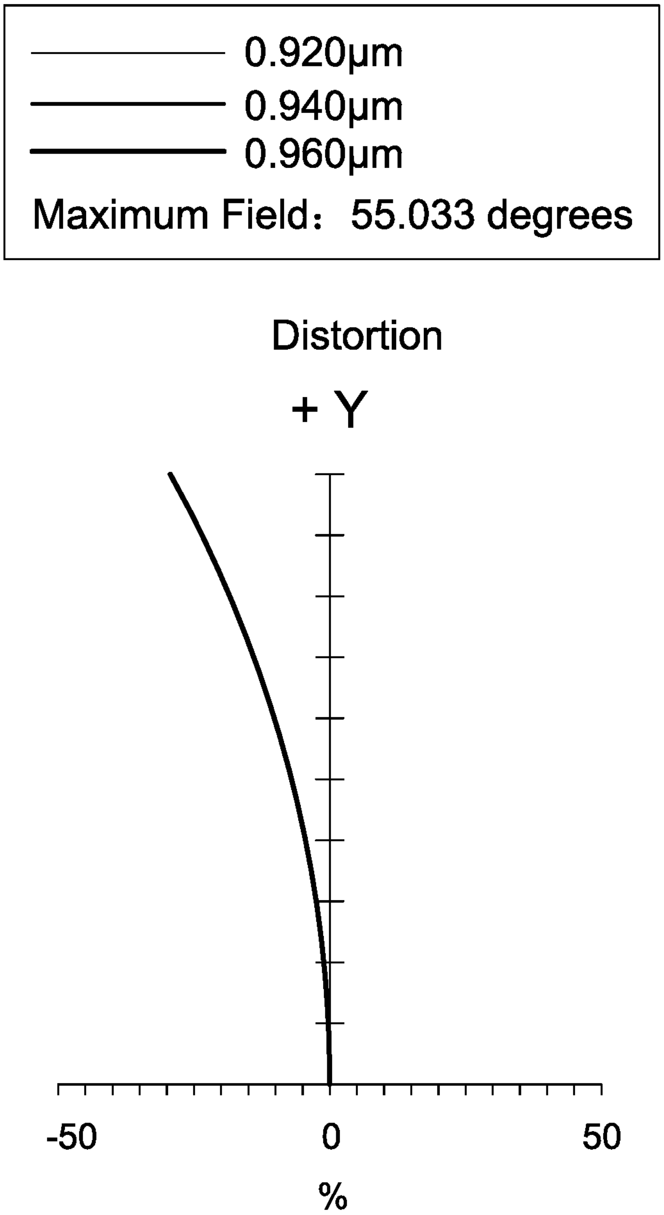

In addition, the wide-angle lens assembly 1 of the first embodiment can meet the requirements of optical performance as seen in FIGS. 2-4. It can be seen from FIG. 2 that the longitudinal aberration in the wide-angle lens assembly 1 of the first embodiment ranges from −0.025 mm to 0.030 mm. It can be seen from FIG. 3 that the field curvature of tangential direction and sagittal direction in the wide-angle lens assembly 1 of the first embodiment ranges from −0.03 mm to 0.03 mm. It can be seen from FIG. 4 that the distortion in the wide-angle lens assembly 1 of the first embodiment ranges from −30% to 0%. It is obvious that the longitudinal aberration, the field curvature, and the distortion of the wide-angle lens assembly 1 of the first embodiment can be corrected effectively. Therefore, the wide-angle lens assembly 1 of the first embodiment is capable of good optical performance.

A detailed description of a wide-angle lens assembly in accordance with a second embodiment of the invention is as follows. Referring to FIG. 5, the wide-angle lens assembly 2 includes a first lens L21, a second lens L22, a stop ST2, a third lens L23, a fourth lens L24, an optical filter OF2, and a cover glass CG2, all of which are arranged in order from an object side to an image side along an optical axis OA2. In operation, the light from the object side is imaged on an image plane IMA2.

According to the foregoing, wherein: the second lens L22 is a meniscus lens, wherein the object side surface S23 is a convex surface; the fourth lens L24 is a meniscus lens, wherein the image side surface S29 is a concave surface; both of object side surface S210 and image side surface S211 of the optical filter OF2 are plane surfaces; and both of the object side surface S212 and image side surface S213 of the cover glass CG2 are plane surfaces.

With the above design of the lenses, stop ST2, and at least one of the conditions (1)-(7) satisfied, the wide-angle lens assembly 2 can have an effective decreased F-number, an effective increased field of view, an effective increased resolution, an effective resisted environment temperature change, and an effective corrected aberration.

Table 4 shows the optical specification of the wide-angle lens assembly 2 in FIG. 5.

TABLE 4

Effective Focal Length = 1.99 mm F-number = 1.25
Total Lens Length = 17.00 mm Field of View = 109.93 degrees

| Surface Number | Radius of Curvature (mm) | Thickness (mm) | Nd | Vd | Effective Focal Length (mm) | Remark |
|---|---|---|---|---|---|---|
| S21 | 11.34 | 0.42 | 1.88 | 40.8 | −10.827 | L21 |
| S22 | 5.03 | 2.55 | | | | |
| S23 | 13.38 | 0.51 | 1.54 | 56 | −7.9672 | L22 |
| S24 | 3.19 | 5.92 | | | | |
| S25 | ∞ | −0.40 | | | | ST2 |
| S26 | 6.27 | 1.47 | 1.8 | 46.5 | 6.16689 | L23 |
| S27 | −19.30 | 0.83 | | | | |
| S28 | 3.48 | 2.71 | 1.64 | 23.5 | 8.09876 | L24 |
| S29 | 8.06 | 1.58 | | | | |
| S210 | ∞ | 0.30 | 1.52 | 64.2 | | OF2 |
| S211 | ∞ | 0.50 | | | | |
| S212 | ∞ | 0.50 | 1.52 | 64.2 | | CG2 |
| S113 | ∞ | 0.11 | | | | |

In the second embodiment, the conic constant k and the aspheric coefficients A, B, C of each aspheric lens are shown in Table 5.

TABLE 5

| Surface Number | k | A | B | C |
|---|---|---|---|---|
| S23 | 0.0000E+00 | 1.99E−03 | −1.09E−04 | 0.00E+00 |
| S24 | 0.0000E+00 | 4.14E−03 | 4.76E−04 | 0.00E+00 |

TABLE 5-continued

| Surface Number | k | A | B | C |
|---|---|---|---|---|
| S28 | 0.0000E+00 | 1.43E−03 | −6.14E−05 | 0.00E+00 |
| S29 | 0.0000E+00 | 2.18E−02 | 6.26E−04 | 8.94E−04 |

Table 6 shows the parameters and condition values for conditions (1)-(7) in accordance with the second embodiment of the invention. It can be seen from Table 6 that the wide-angle lens assembly 2 of the second embodiment satisfies the conditions (1)-(7).

TABLE 6

| | | | | | |
|---|---|---|---|---|---|
| CT2 | 0.51 mm | CT3 | 1.47 mm | Td2 | 5.51 mm |
| Td3 | 0.83 mm | BFL | 2.99 mm | | |
| f1/f2 | 1.36 | (CT2 + CT3)/Td2 | 0.36 | (Td2 + Td3)/TTL | 0.37 |
| (Td2 + Td3)/BFL | 2.12 | f3/f4 | 0.76 | CT3/TTL | 0.09 |
| f1/TTL | −0.64 | | | | |

Figure 6:
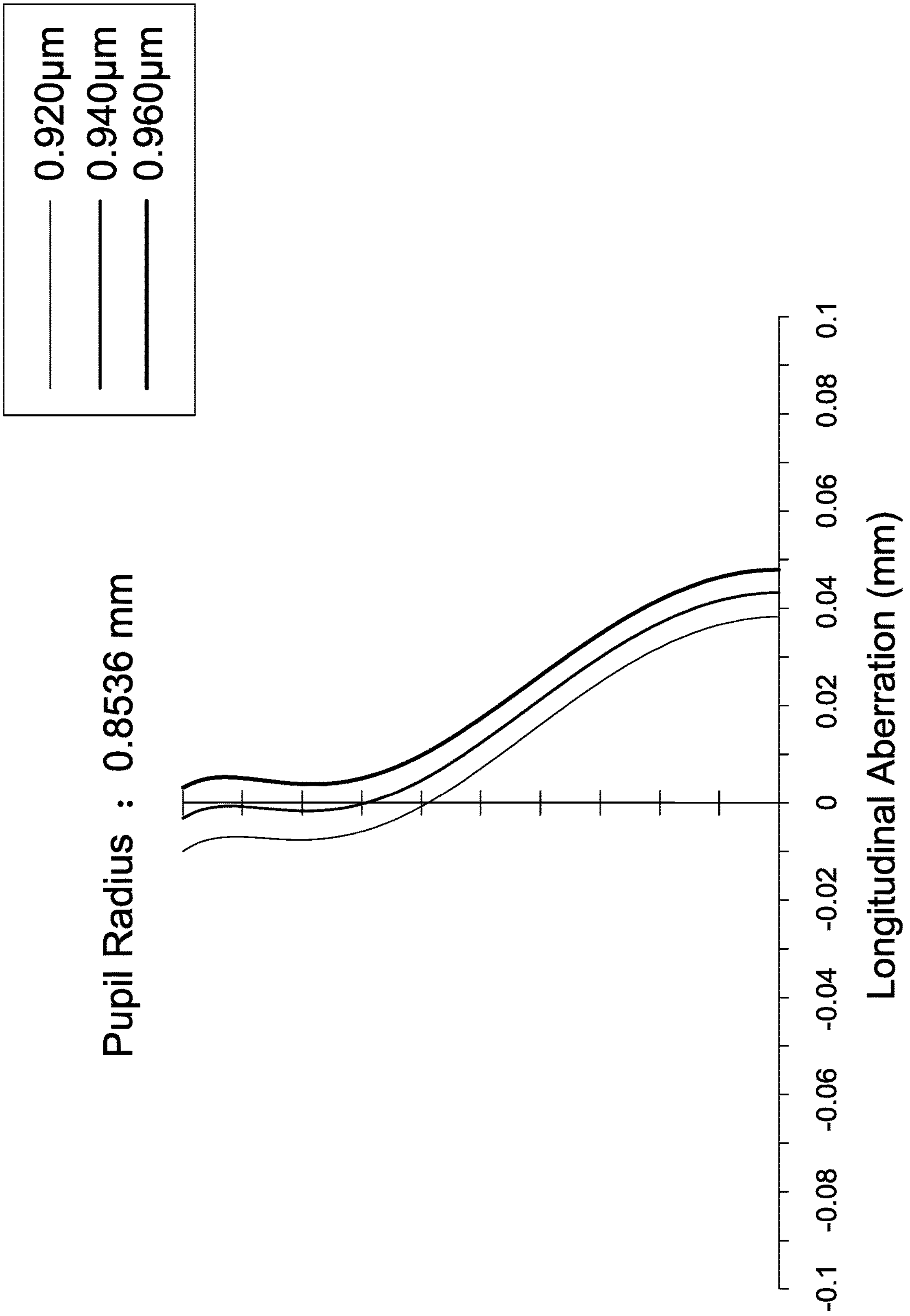
FIGS. 6, 7, 8 depict a longitudinal aberration diagram, a field curvature diagram, and a distortion diagram of the wide-angle lens assembly in accordance with the second embodiment of the invention, respectively.
Figure 7:
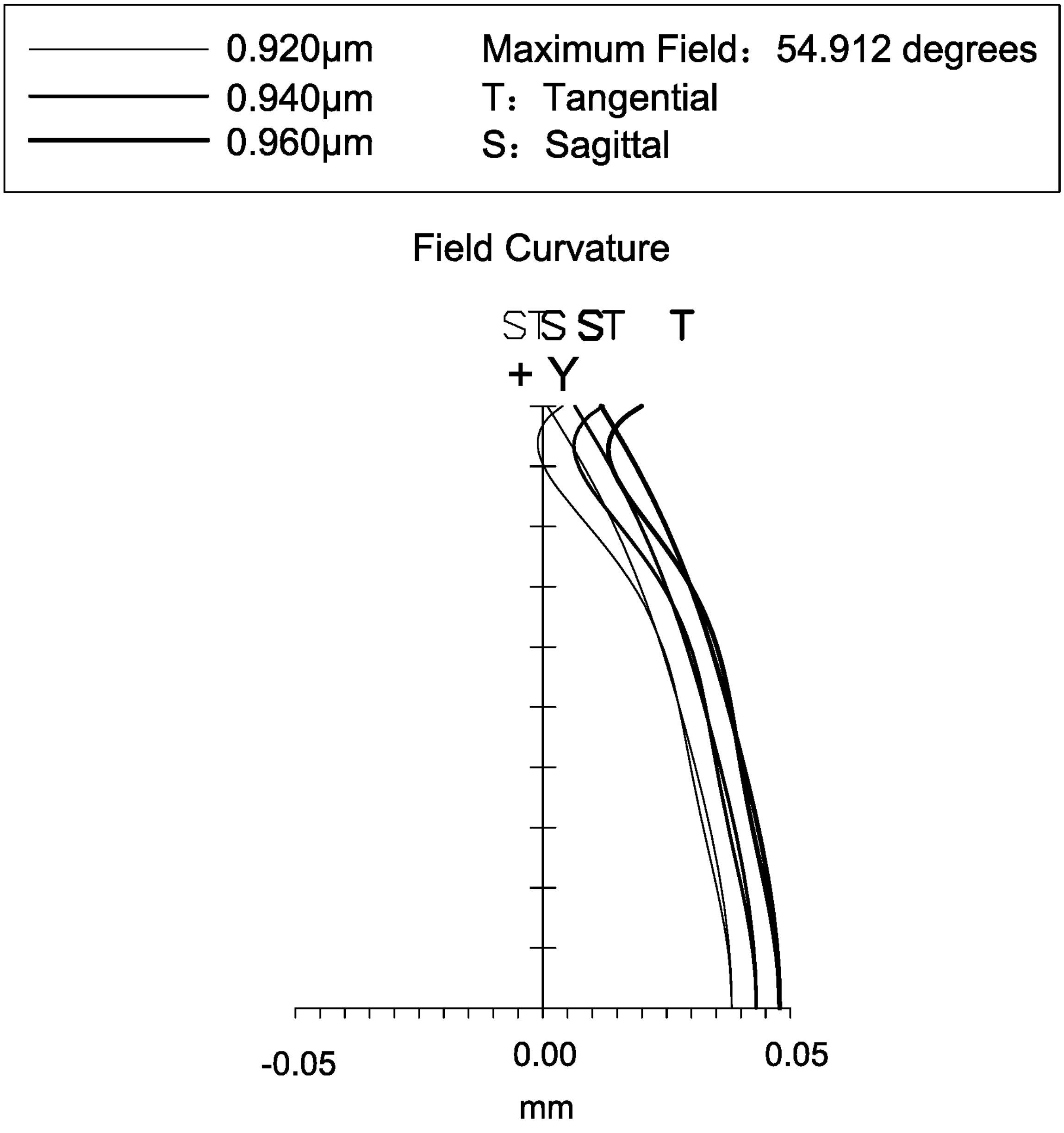
Figure 8:
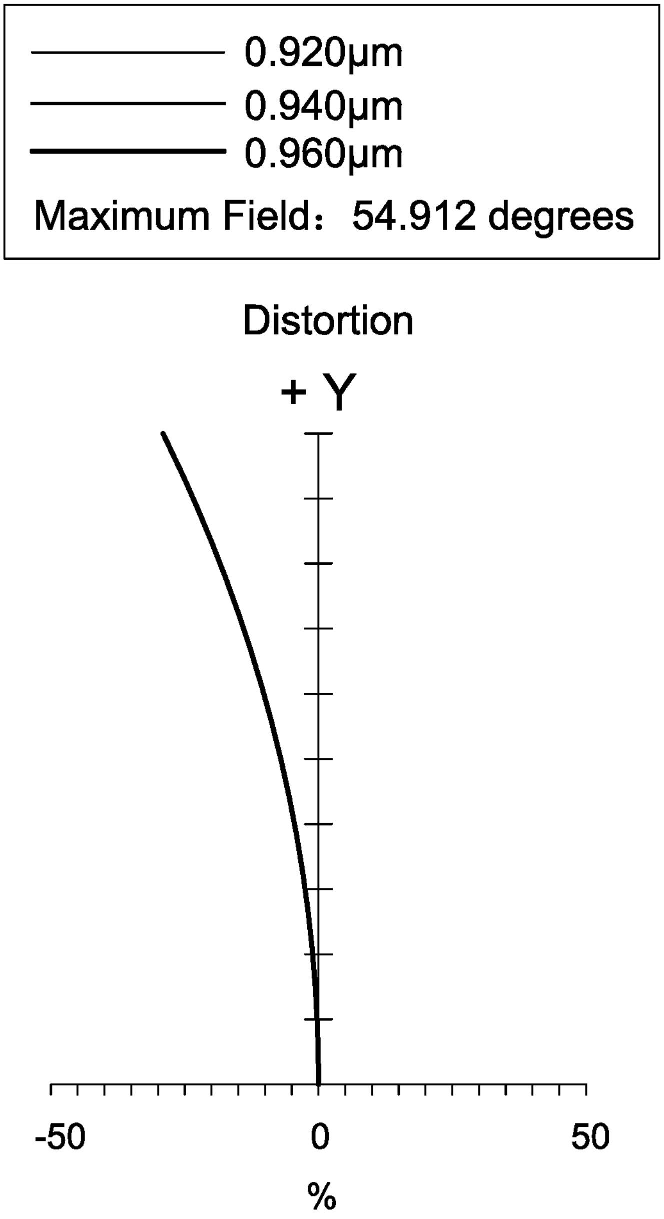

In addition, the wide-angle lens assembly 2 of the second embodiment can meet the requirements of optical performance as seen in FIGS. 6-8. It can be seen from FIG. 6 that the longitudinal aberration in the wide-angle lens assembly 2 of the second embodiment ranges from −0.01 mm to 0.05 mm. It can be seen from FIG. 7 that the field curvature of tangential direction and sagittal direction in the wide-angle lens assembly 2 of the second embodiment ranges from −0.005 mm to 0.05 mm. It can be seen from FIG. 8 that the distortion in the wide-angle lens assembly 2 of the second embodiment ranges from −30% to 0%. It is obvious that the longitudinal aberration, the field curvature, and the distortion of the wide-angle lens assembly 2 of the second embodiment can be corrected effectively. Therefore, the wide-angle lens assembly 2 of the second embodiment is capable of good optical performance.

A detailed description of a wide-angle lens assembly in accordance with a third embodiment of the invention is as follows. Referring to FIG. 9, the wide-angle lens assembly 3 includes a first lens L31, a second lens L32, a stop ST3, a third lens L33, a fourth lens L34, an optical filter OF3, and a cover glass CG3, all of which are arranged in order from an object side to an image side along an optical axis OA3. In operation, the light from the object side is imaged on an image plane IMA3.

According to the foregoing, wherein: the second lens L32 is a meniscus lens, wherein the object side surface S33 is a convex surface; the fourth lens L34 is a biconvex lens, wherein the image side surface S39 is a convex surface; both of object side surface S310 and image side surface S311 of the optical filter OF3 are plane surfaces; and both of the object side surface S312 and image side surface S313 of the cover glass CG3 are plane surfaces.

With the above design of the lenses, stop ST3, and at least one of the conditions (1)-(7) satisfied, the wide-angle lens assembly 3 can have an effective decreased F-number, an effective increased field of view, an effective increased resolution, an effective resisted environment temperature change, and an effective corrected aberration.

Table 7 shows the optical specification of the wide-angle lens assembly 3 in FIG. 9.

TABLE 7

| Effective Focal Length = 1.95 mm F-number = 1.29 Total Lens Length = 16.99 mm Field of View = 110.05 degrees | | | | | | |
|---|---|---|---|---|---|---|
| Surface Number | Radius of Curvature (mm) | Thickness (mm) | Nd | Vd | Effective Focal Length (mm) | Remark |
| S31 | 13.29 | 0.42 | 2 | 25.4 | −8.471 | L31 |
| S32 | 4.99 | 1.93 | | | | |
| S33 | 31.17 | 1.87 | 1.54 | 56 | −7.091 | L32 |
| S34 | 3.31 | 4.21 | | | | |
| S35 | ∞ | −0.33 | | | | ST3 |
| S36 | 7.00 | 2.08 | 1.9 | 37.4 | 5.714 | L33 |
| S37 | −15.28 | 0.54 | | | | |
| S38 | 4.55 | 3.07 | 1.64 | 23.5 | 6.673 | L34 |
| S39 | −31.46 | 1.90 | | | | |
| S310 | ∞ | 0.21 | 1.52 | 64.2 | | OF3 |
| S311 | ∞ | 0.50 | | | | |
| S312 | ∞ | 0.50 | 1.52 | 64.2 | | CG3 |
| S313 | ∞ | 0.11 | | | | |

In the third embodiment, the conic constant k and the aspheric coefficients A, B, C of each aspheric lens are shown in Table 8.

TABLE 8

| Surface Number | k | A | B | C |
|---|---|---|---|---|
| S33 | 0.0000E+00 | 3.47E−03 | −1.12E−04 | 0.00E+00 |
| S34 | 0.0000E+00 | 8.62E−03 | 8.35E−04 | 0.00E+00 |
| S38 | 0.0000E+00 | 8.23E−04 | 1.31E−04 | −1.25E−05 |
| S39 | 0.0000E+00 | 1.64E−02 | −4.31E−04 | 3.80E−04 |

Table 9 shows the parameters and condition values for conditions (1)-(7) in accordance with the third embodiment of the invention. It can be seen from Table 9 that the wide-angle lens assembly 3 of the third embodiment satisfies the conditions (1)-(7).

TABLE 9

| | | | | | |
|---|---|---|---|---|---|
| CT2 | 1.87 mm | CT3 | 2.08 mm | Td2 | 3.88 mm |
| Td3 | 0.54 mm | BFL | 3.22 mm | | |
| f1/f2 | 1.19 | (CT2 + CT3)/Td2 | 1.02 | (Td2 + Td3)/TTL | 0.26 |
| (Td2 + Td3)/BFL | 1.38 | f3/f4 | 0.86 | CT3/TTL | 0.12 |
| f1/TTL | −0.50 | | | | |

Figure 10:
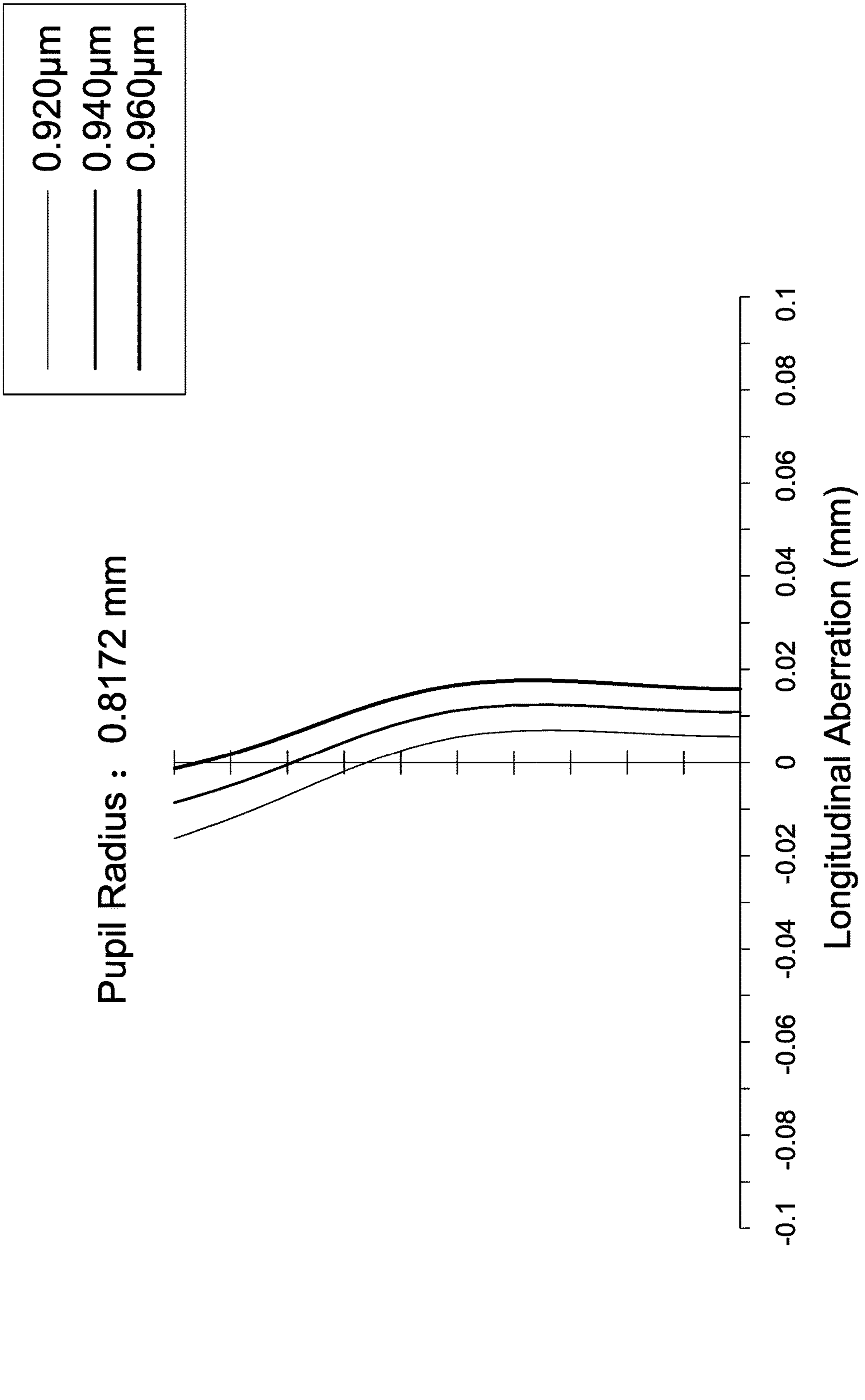
FIGS. 10, 11, 12 depict a longitudinal aberration diagram, a field curvature diagram, and a distortion diagram of the wide-angle lens assembly in accordance with the third embodiment of the invention, respectively.
Figure 11:
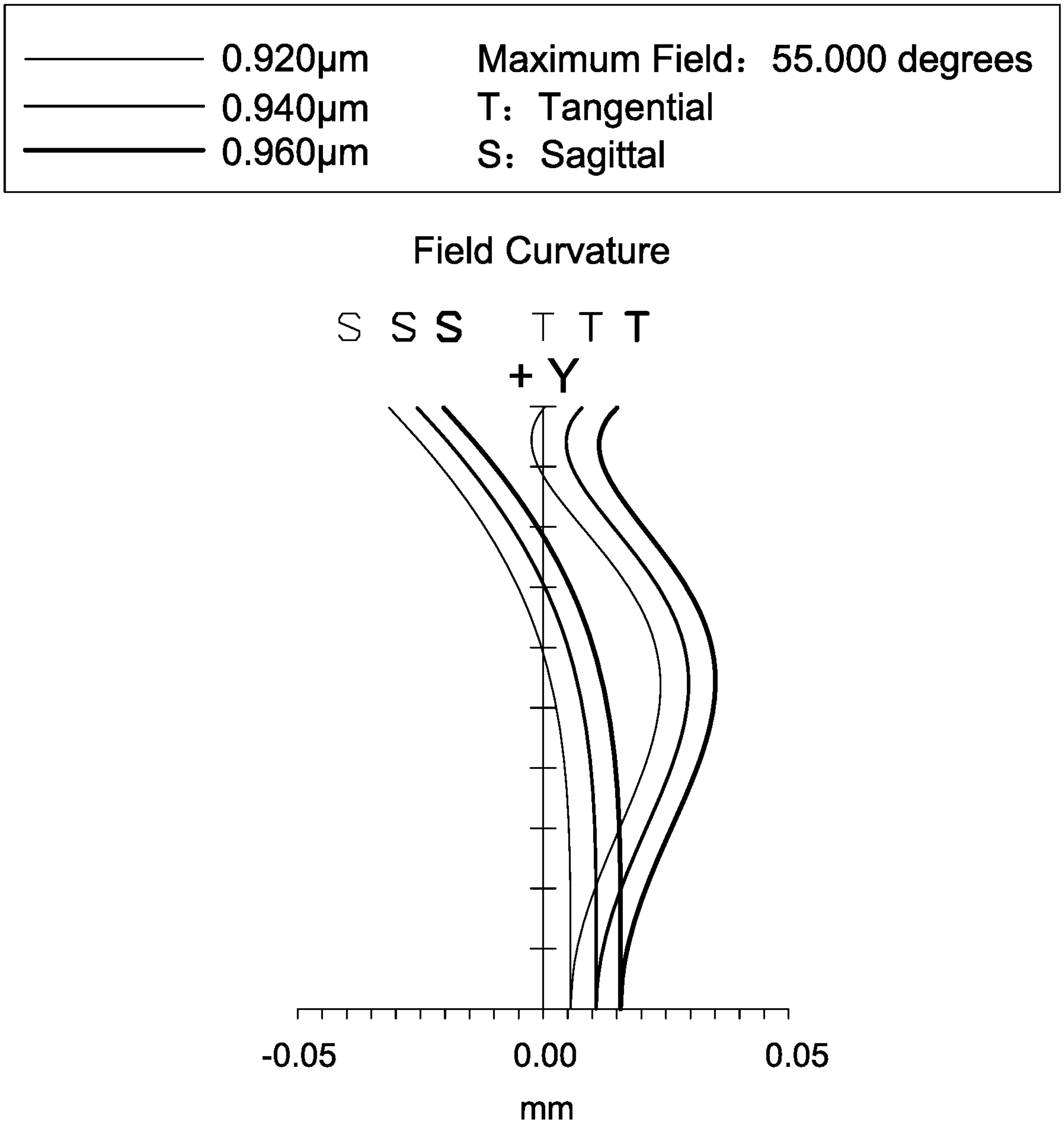
Figure 12:
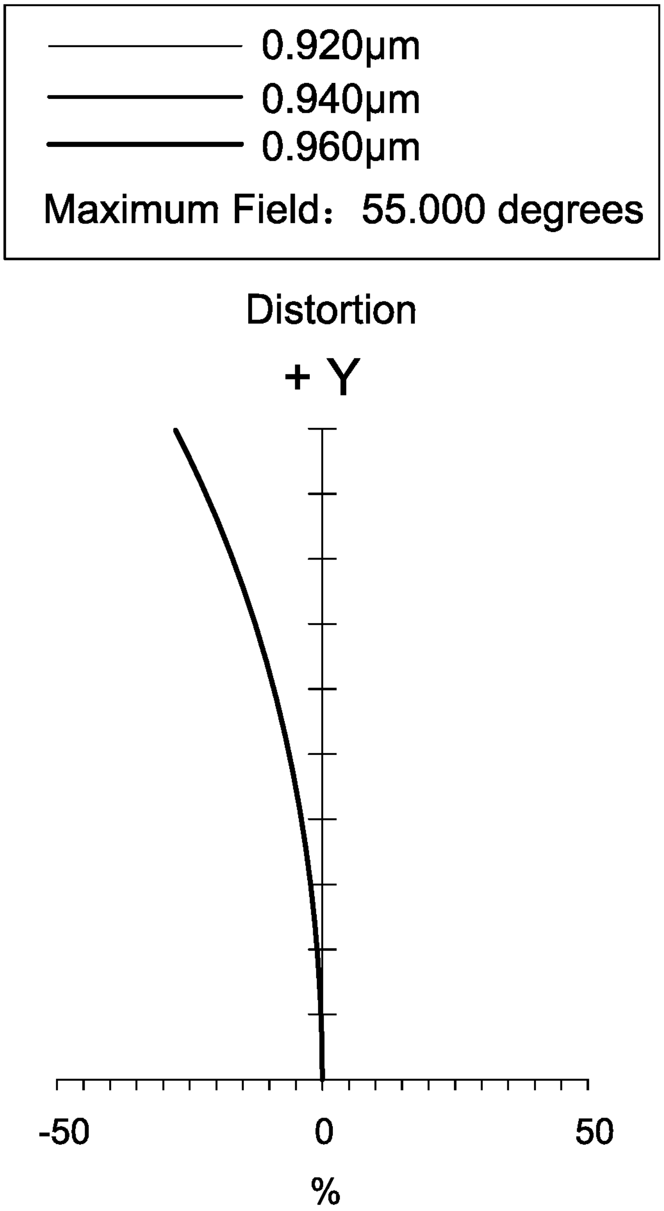

In addition, the wide-angle lens assembly 3 of the third embodiment can meet the requirements of optical performance as seen in FIGS. 10-12. It can be seen from FIG. 10 that the longitudinal aberration in the wide-angle lens assembly 3 of the third embodiment ranges from −0.02 mm to 0.02 mm. It can be seen from FIG. 11 that the field curvature of tangential direction and sagittal direction in the wide-angle lens assembly 3 of the third embodiment ranges from −0.035 mm to 0.035 mm. It can be seen from FIG. 12 that the distortion in the wide-angle lens assembly 3 of the third embodiment ranges from −30% to 0%. It is obvious that the longitudinal aberration, the field curvature, and the distortion of the wide-angle lens assembly 3 of the third embodiment can be corrected effectively. Therefore, the wide-angle lens assembly 3 of the third embodiment is capable of good optical performance.

In the above mentioned embodiments, the wide-angle lens assembly of the invention can also add a reflective element disposed next to the stop or a reflective element disposed between the fourth lens and the image plane, wherein the reflective element is a prism or a mirror.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:

a first lens which is a meniscus lens with negative refractive power and comprises a convex surface facing an object side and a concave surface facing an image side;

a second lens which is with refractive power and comprises a concave surface facing the image side;

a third lens which is a biconvex lens with positive refractive power and comprises a convex surface facing the object side and another convex surface facing the image side; and a fourth lens which is with refractive power;

wherein the first lens, the second lens, the third lens, and the fourth lens are arranged in order from the object side to the image side along an optical axis;

wherein the wide-angle lens assembly satisfies at least one of following conditions:

$$0.3 \le (CT2 + CT3)/Td2 \le 1.1;$$

$$0.25 \le (Td2 - Td3)/TTL \le 0.38;$$

wherein CT2 is an interval from an object side surface of the second lens to an image side surface of the second lens along the optical axis, CT3 is an interval from an object side surface of the third lens to an image side surface of the third lens along the optical axis, Td2 is an interval from the image side surface of the second lens to the object side surface of the third lens along the optical axis, Td3 is an interval from the image side surface of the third lens to an object side surface of the fourth lens along the optical axis, and TTL is an interval from an object side surface of the first lens to an image plane along the optical axis.

2. The wide-angle lens assembly as claimed in claim 1, wherein the fourth lens is with positive refractive power.

3. The wide-angle lens assembly as claimed in claim 2, wherein the fourth lens comprises a convex surface facing the object side.

4. The wide-angle lens assembly as claimed in claim 3, wherein the fourth lens further comprises a concave surface facing the image side.

5. The wide-angle lens assembly as claimed in claim 4, wherein the wide-angle lens assembly satisfies at least one of following conditions:

$$0.08 \le CT3/TTL \le 0.15;$$

$$-0.7 \le f1/TTL \le -0.4;$$

$$1.0 \le f1/f2 \le 1.4;$$

$$0.7 \le f3/f4 \le 0.9;$$

$$1.3 \le (Td2 + Td3)/BFL \le 2.2;$$

wherein f1 is an effective focal length of the first lens, f2 is an effective focal length of the second lens, f3 is an effective focal length of the third lens, f4 is an effective focal length of the fourth lens, CT3 is the interval from the object side surface of the third lens to the image side surface of the third lens along the optical axis, Td2 is the interval from the image side surface of the second lens to the object side surface of the third lens along the optical axis, Td3 is the interval from the image side surface of the third lens to the object side surface of the fourth lens along the optical axis, TTL is the interval from the object side surface of the first lens to the image plane along the optical axis, and BFL is an interval from an image side surface of the fourth lens to the image plane along the optical axis.

6. The wide-angle lens assembly as claimed in claim 3, wherein the fourth lens further comprises a convex surface facing the image side.

7. The wide-angle lens assembly as claimed in claim 6, wherein the wide-angle lens assembly satisfies at least one of following conditions:

$$0.08 \le CT3/TTL \le 0.15;$$

$$-0.7 \le f1/TTL \le -0.4;$$

$$1.0 \le f1/f2 \le 1.4;$$

$$0.7 \le f3/f4 \le 0.9;$$

$$1.3 \le (Td2 + Td3)/BFL \le 2.2;$$

wherein f1 is an effective focal length of the first lens, f2 is an effective focal length of the second lens, f3 is an effective focal length of the third lens, f4 is an effective focal length of the fourth lens, CT3 is the interval from the object side surface of the third lens to the image side surface of the third lens along the optical axis, Td2 is the interval from the image side surface of the second lens to the object side surface of the third lens along the optical axis, Td3 is the interval from the image side surface of the third lens to the object side surface of the fourth lens along the optical axis, TTL is the interval from the object side surface of the first lens to the image plane along the optical axis, and BFL is an interval from an image side surface of the fourth lens to the image plane along the optical axis.

8. The wide-angle lens assembly as claimed in claim 1, wherein the second lens is with negative refractive power.

9. The wide-angle lens assembly as claimed in claim 8, wherein the second lens further comprises a concave surface facing the object side.

10. The wide-angle lens assembly as claimed in claim 9, wherein the wide-angle lens assembly satisfies at least one of following conditions:

$$0.08 \le CT3/TTL \le 0.15;$$

$$-0.7 \le f1/TTL \le -0.4;$$

$$1.0 \le f1/f2 \le 1.4;$$

$$0.7 \le f3/f4 \le 0.9;$$

$$1.3 \le (Td2 + Td3)/BFL \le 2.2;$$

wherein f1 is an effective focal length of the first lens, f2 is an effective focal length of the second lens, f3 is an effective focal length of the third lens, f4 is an effective focal length of the fourth lens, CT3 is the interval from the object side surface of the third lens to the image side surface of the third lens along the optical axis, Td2 is the interval from the image side surface of the second lens to the object side surface of the third lens along the optical axis, Td3 is the interval from the image side surface of the third lens to the object side surface of the fourth lens along the optical axis, TTL is the interval from the object side surface of the first lens to the image plane along the optical axis, and BFL is an interval from an image side surface of the fourth lens to the image plane along the optical axis.

11. The wide-angle lens assembly as claimed in claim 8, wherein the second lens further comprises a convex surface facing the object side.

12. The wide-angle lens assembly as claimed in claim 11, wherein the wide-angle lens assembly satisfies at least one of following conditions:

$$0.08 \le CT3/TTL \le 0.15;$$

$$-0.7 \le f1/TTL \le -0.4;$$

$$1.0 \le f1/f2 \le 1.4;$$

$$0.7 \le f3/f4 \le 0.9;$$

$$1.3 \le (Td2 + Td3)/BFL \le 2.2;$$

wherein f1 is an effective focal length of the first lens, f2 is an effective focal length of the second lens, f3 is an effective focal length of the third lens, f4 is an effective focal length of the fourth lens, CT3 is the interval from the object side surface of the third lens to the image side surface of the third lens along the optical axis, Td2 is the interval from the image side surface of the second lens to the object side surface of the third lens along the optical axis, Td3 is the interval from the image side surface of the third lens to the object side surface of the fourth lens along the optical axis, TTL is the interval from the object side surface of the first lens to the image plane along the optical axis, and BFL is an interval from an image side surface of the fourth lens to the image plane along the optical axis.

13. The wide-angle lens assembly as claimed in claim 1, further comprising a stop disposed between the second lens and the third lens, or further comprising a stop disposed between the second lens and the third lens and a reflective element disposed next to the stop, or further comprising a stop disposed between the second lens and the third lens and a reflective element disposed between the fourth lens and the image plane.

14. The wide-angle lens assembly as claimed in claim 13, wherein the wide-angle lens assembly satisfies at least one of following conditions:

$$0.08 \le CT3/TTL \le 0.15;$$

$$-0.7 \le f1/TTL \le -0.4;$$

$$1.0 \le f1/f2 \le 1.4;$$

$$0.7 \le f3/f4 \le 0.9;$$

$$1.3 \le (Td2 + Td3)/BFL \le 2.2;$$

wherein f1 is an effective focal length of the first lens, f2 is an effective focal length of the second lens, f3 is an effective focal length of the third lens, f4 is an effective focal length of the fourth lens, CT3 is the interval from the object side surface of the third lens to the image side surface of the third lens along the optical axis, Td2 is the interval from the image side surface of the second lens to the object side surface of the third lens along the optical axis, Td3 is the interval from the image side surface of the third lens to the object side surface of the fourth lens along the optical axis, TTL is the interval from the object side surface of the first lens to the image plane along the optical axis, and BFL is an interval from an image side surface of the fourth lens to the image plane along the optical axis.

15. The wide-angle lens assembly as claimed in claim 1, wherein the second lens is an aspheric lens or the fourth lens is an aspheric lens.

16. The wide-angle lens assembly as claimed in claim 15, wherein the wide-angle lens assembly satisfies at least one of following conditions:

$$0.08 \leq CT3/TTL \leq 0.15;$$

$$-0.7 \leq f1/TTL \leq -0.4;$$

$$1.0 \leq f1/f2 \leq 1.4;$$

$$0.7 \leq f3/f4 \leq 0.9;$$

$$1.3 \leq (Td2 + Td3)/BFL \leq 2.2;$$

wherein f1 is an effective focal length of the first lens, f2 is an effective focal length of the second lens, f3 is an effective focal length of the third lens, f4 is an effective focal length of the fourth lens, CT3 is the interval from the object side surface of the third lens to the image side surface of the third lens along the optical axis, Td2 is the interval from the image side surface of the second lens to the object side surface of the third lens along the optical axis, Td3 is the interval from the image side surface of the third lens to the object side surface of the fourth lens along the optical axis, TTL is the interval from the object side surface of the first lens to the image plane along the optical axis, and BFL is an interval from an image side surface of the fourth lens to the image plane along the optical axis.

17. The wide-angle lens assembly as claimed in claim 16, wherein:

the second lens is with negative refractive power and further comprises another concave surface facing the object side;

the fourth lens is with positive refractive power and comprises a convex surface facing the object side and a concave surface facing the image side; and the wide-angle lens assembly further comprises a stop disposed between the second lens and the third lens, or further comprising a stop disposed between the second lens and the third lens and a reflective element disposed next to the stop, or further comprising a stop disposed between the second lens and the third lens and a reflective element disposed between the fourth lens and the image plane.

18. The wide-angle lens assembly as claimed in claim 16, wherein:

the second lens is with negative refractive power and further comprises another concave surface facing the object side;

the fourth lens is with positive refractive power and comprises a convex surface facing the object side and another convex surface facing the image side; and the wide-angle lens assembly further comprises a stop disposed between the second lens and the third lens, or further comprising a stop disposed between the second lens and the third lens and a reflective element disposed next to the stop, or further comprising a stop disposed between the second lens and the third lens and a reflective element disposed between the fourth lens and the image plane.

19. The wide-angle lens assembly as claimed in claim 16, wherein:

the second lens is with negative refractive power and further comprises a convex surface facing the object side;

the fourth lens is with positive refractive power and comprises a convex surface facing the object side and a concave surface facing the image side; and the wide-angle lens assembly further comprises a stop disposed between the second lens and the third lens, or further comprising a stop disposed between the second lens and the third lens and a reflective element disposed next to the stop, or further comprising a stop disposed between the second lens and the third lens and a reflective element disposed between the fourth lens and the image plane.

20. The wide-angle lens assembly as claimed in claim 16, wherein:

the second lens is with negative refractive power and further comprises a convex surface facing the object side;

the fourth lens is with positive refractive power and comprises a convex surface facing the object side and another convex surface facing the image side; and the wide-angle lens assembly further comprises a stop disposed between the second lens and the third lens, or further comprising a stop disposed between the second lens and the third lens and a reflective element disposed next to the stop, or further comprising a stop disposed between the second lens and the third lens and a reflective element disposed between the fourth lens and the image plane.

* * * * *